ized and also capable of causing the shutter to start
United States Patent

Kikuchi et al.

[15] 3,641,902
[45] Feb. 15, 1972

[54] ELECTRONIC SHUTTER WITH ELECTRONICALLY CONTROLLED SELF-TIMER FOR PHOTOGRAPHIC CAMERA

[72] Inventors: Tomio Kikuchi, Tokorozawa; Kiyokuki Arai, Gyoda, both of Japan

[73] Assignee: Kabushiki Kaisha Koparu, Tokyo-to, Japan

[22] Filed: Apr. 20, 1970

[21] Appl. No.: 30,162

[52] U.S. Cl. .......................... 95/53.3, 95/10 CT, 95/53 EA
[51] Int. Cl. .................. G03b 17/40, G03b 7/08, G03b 9/62
[58] Field of Search .................. 95/10 C, 53 E, 53 EA, 53.3, 95/53.6, 53 R

[56] References Cited

UNITED STATES PATENTS

| 3,450,015 | 6/1969 | Reimann et al. | 95/53.3 |
| 3,506,881 | 4/1970 | Leary | 95/10 C |

FOREIGN PATENTS OR APPLICATIONS

| 995,790 | 6/1965 | Great Britain | 95/53 EA |

Primary Examiner—Samuel S. Matthews
Assistant Examiner—Russell E. Adams, Jr.
Attorney—Cushman, Darby & Cushman

[57] ABSTRACT

An electronic shutter equipped with an electronically controlled self-timer for use in photographic cameras, comprising a first delay circuit comprised of a photoconductive element and a capacitor and capable of controlling the exposure time, a first electronic switching means adapted to be controlled by said first delay circuit, an electromagnet connected to said first electronic switching means via an amplifier and capable of causing the shutter to start its opening movement upon being energized and also capable of causing the shutter to start its closing movement upon being subsequently deenergized, a second delay circuit comprised of a resistor and a capacitor and capable of controlling the self-timing, and a second electronic switching means adapted to be controlled by said second delay circuit, said electronic shutter being arranged so that said electromagnet will never become energized, via said first electronic switching means, by virtue of the action of said second electronic switching means so long as the second delay circuit remains to be actuated.

10 Claims, 3 Drawing Figures

INVENTORS
TOMIO KIKUCHI
KIYOYUKI ARAI

BY Cushman, Darby &
Cushman
ATTORNEYS 3,641,902

ELECTRONIC SHUTTER WITH ELECTRONICALLY CONTROLLED SELF-TIMER FOR PHOTOGRAPHIC CAMERA

BACKGROUND OF THE INVENTION

1. Field of the Invention

The present invention is concerned with an electronic shutter equipped with a self-timer, and more particularly, it is related to an electronic shutter equipped with a self-timer adapted to be controlled electronically.

2. Description of the Prior Art

There have been known electronic shutters adapted to be controlled electronically of the exposure time. Also known are self-timers capable of electronically controlling the self-timing, i.e., the period of time from the time at which the shutter mechanism of the camera is released upon the application of a pressure onto the shutter button till the time at which the opening movement of the shutter is started. Also known are the arrangement in which the self-timer thus electronically controlled is incorporated in such an electronic shutter as the one described which is for in photographic cameras.

However, these electronic shutters equipped with a known electronically controlled self-timer invariably utilize at least two electromagnets. One of these two electromagnets is intended for starting the opening movement of the shutter upon completion of the control of the delay time for the self-timing, whereas the other of the two electromagnets is intended for starting the closing movement of the shutter upon completion of the control of the delay time for the exposure time. The use of these two electromagnets, however, is greatly disadvantageous since they consume a large amount of electric power. If the electromagnet which is intended for the control of self-timing is energized continuously throughout the period of time in which the self-timing is controlled, the amount of the electric power which is consumed during such a period of time will be tremendously large.

Also known is the arrangement in which most of the structural elements forming the circuit for controlling the exposure time are shared by the circuit for controlling the self-timing as being the elements in common to both of these two circuits. In such an arrangement, however, the delay circuit for the control of the exposure time is adapted to be cut off from the power source circuit during the period of time in which the device is controlling the self-timing, whereas the delay circuit for controlling the self-timing is adapted to be cut off from the power source circuit during the period of time in which the device is performing the control of the exposure time. This means that there is provided a changeover switch for changing over the connection between the delay circuit for controlling the self-timing and the delay circuit for controlling the exposure time. The provision of the aforesaid changeover switch in such a control circuit of an electronic shutter for a photographic camera as is assigned for performing the control of a very small length of time of exposure, such as 1/500 second, is not desirable because of the possibility for a spark or poor contact to occur during the switching operation.

SUMMARY OF THE INVENTION

It is, therefore, an object of the present invention to provide an electronic shutter equipped with an electronically controlled self-timer and utilizing only one electromagnet.

Another object of the present invention is to provide an electronic shutter equipped with an electronically controlled self-timer, which is not provided with a changeover switch having such a mechanical contact as is operative so that, following the releasing operation of the shutter mechanism of the camera, the connection between the delay circuit for controlling the exposure time and the delay circuit for controlling the self-timing is changed over.

Still another object of the present invention is to provide an electronic shutter equipped with an electronically controlled self-timer, comprising an electromagnet capable of starting the opening movement of the shutter upon the energization of the electromagnet and capable of starting the closing movement of the shutter upon the electromagnet being deenergized subsequently by the delay circuit assigned for controlling the exposure time, and a delay circuit for controlling the self-timing being arranged so that the shutter is operative in such a way that said electromagnet will never become energized when the latter delay circuit for controlling the self-timing remains to be actuated, even after the power switch has been closed.

DESCRIPTION OF THE PREFERRED EMBODIMENTS

Figure 1:
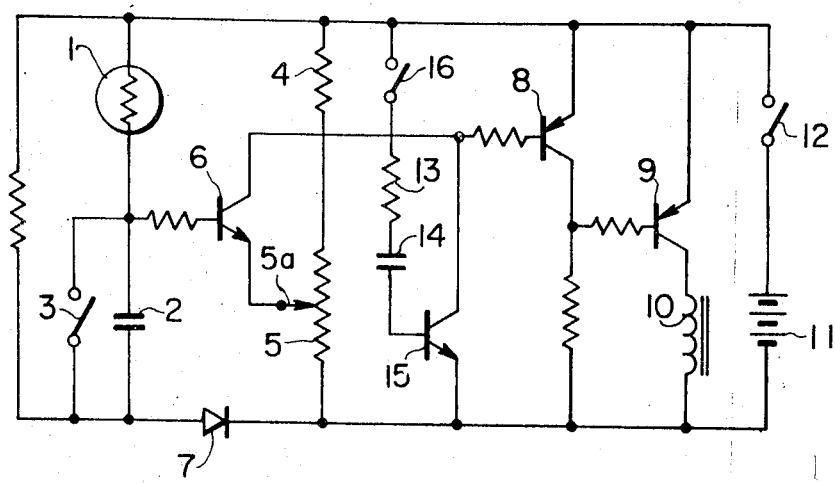
FIG. 1 is a circuit diagram, showing an example of the control circuit of the electronic shutter equipped with an electronically controlled self-timer of the present invention.

In FIG. 1, reference numeral 1 represents a photoconductive element which is arranged in the foreground of the camera. The value of resistance of this photoconductive element 1 is adapted to vary depending on the intensity of the incident illumination of the scene to be photographed. Said photoconductive element 1 and a capacitor jointly constitute a delay circuit for controlling the exposure time. This delay circuit for controlling the exposure time is actuated upon the opening of a switch 3. A resistor 4 and a potentiometer 5 jointly determine the potential of the emitter electrode of a transistor 6. A slidable member 5a of the potentiometer 5 is adapted to act interlockingly with either the diaphragm-setting member and/or the film sensitivity-setting member to regulate the value of resistance of said potentiometer 5 prior to performing a photography. Unless being used for the establishment of the exposure factors, such as the size of the opening of the diaphragm, said potentiometer 5 may be utilized for the adjustment of the circuit during the manufacture of the shutter system. A diode 7 serves not only for the temperature compensation of the transistor 6, but also for biasing the potential of the base electrode of the transistor 6 especially in case the latter is a silicon transistor.

A transistor 8 is arranged so that its base electrode is connected to the collector electrode of the transistor 6. A transistor 9 is arranged so that its base electrode is connected to the collector electrode of the transistor 8. An electromagnet 10 is connected between the collector electrode of the transistor 9 and the power source battery 11. By closing a power switch 12 in the state of the circuit shown in FIG. 1, the two transistors 6 and 8 are both retained in the "cutoff" state because the potential of the base electrode of the transistor 6 is lower than the potential of the emitter electrode of this transistor 6. Accordingly, the transistor 9 is rendered to the "on" state, so that an electric current is supplied to the electromagnet 10.

A resistor 13 and a capacitor 14 jointly constitute a delay circuit for controlling the self-timing. A transistor 15 is arranged so that its base electrode is connected to the capacitor 14 and that its collector electrode is connected to the base electrode of the transistor 8. By closing a switch 16, this delay circuit for controlling the self-timing is actuated.

Figure 3:
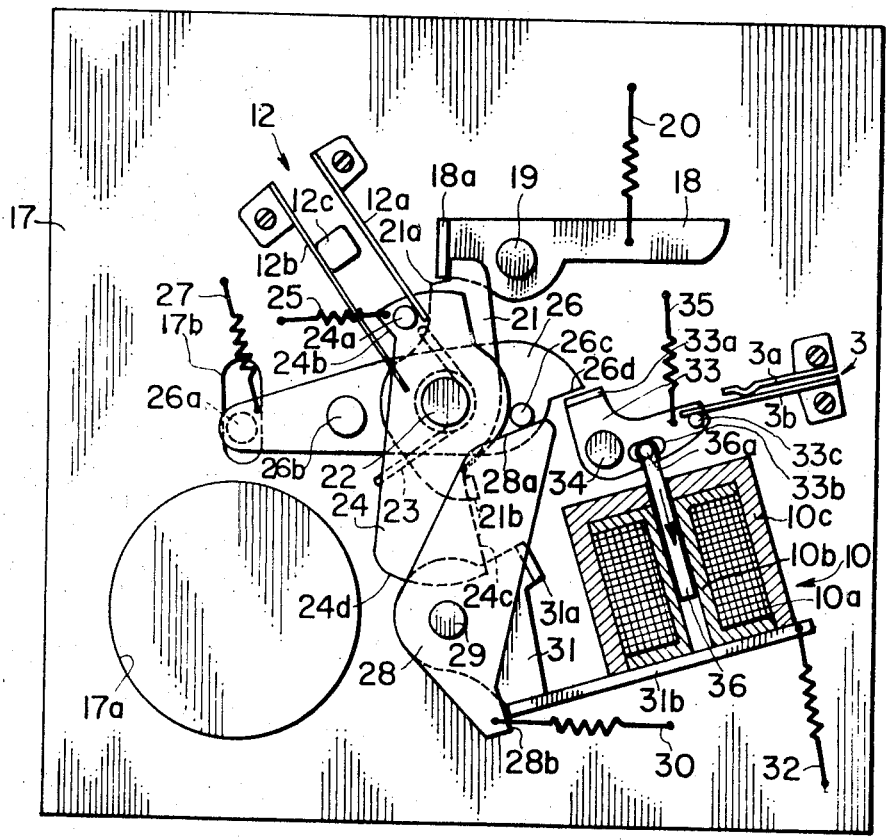
FIG. 3 is a somewhat diagrammatic explanatory representation, showing an example of the shutter mechanism capable of performing the opening and closing actions of the shutter in each of the instances wherein the two circuits shown in FIGS. 1 and 2 are used, respectively.

In FIG. 3, a baseplate 17 is provided with an exposure aperture 17a and a slot 17b. A release lever 18 is provided with a bent portion 18a and is rotatably mounted on a shaft 19. A spring 20 is of a force sufficient for rotating said release lever 18 counterclockwise. An auxiliary driving member 21 is provided with a stepped portion 21a and a bent portion 21b and is rotatably mounted on a shaft 22. A spring 23 is of a force sufficient for rotating said auxiliary driving member 21 clockwise.

A principal driving member 24 is provided with a pin 24a and three side faces 24b, 24c and 24d and is rotatably mounted on said shaft 22. A spring 25 is of a force sufficient for rotating the principal driving member 24 counterclockwise. This force of the spring 25 is greater than the force of the spring 23.

A shutter-actuating member 26 is provided with pins 26a, 26b and 26c and a stepped portion 26d and is rotatably mounted on the shaft 22. A spring 27 is of a force sufficient for rotating this shutter-actuating member 26 clockwise. A holding member 28 is provided with two side faces 28a and 28b and is rotatably mounted on a shaft 29. A spring 30 is of a force sufficient for rotating this holding member 28 counterclockwise. A shutter-closing member 31 is provided with two bent portions 31a and 31b and is rotatably mounted on said shaft 29. A spring 32 is of a force sufficient for rotating said shutter-closing member 31 clockwise. A shutter-opening member 33 is provided with a bent portion 33a, a slot 33b and a pin 33c and is rotatably mounted on a shaft 34. A spring 35 is of a force sufficient for rotating said shutter-opening member 33 counterclockwise.

In FIg. 3, a switch 3, an electromagnet 10 and a power switch 12, all of which are as shown in FIG. 1, are indicated by like reference numerals. All of these three elements are fixed to the baseplate 17 in appropriate manners. The switch 3 is comprised of two resilient strips 3a and 3b. In FIG. 3, the resilient strip 3b of the switch 3 is seen to be pushed by the pin 33c of the shutter-opening member 33 so that these two resilient strips 3a and 3b are brought into contact with each other. The electromagnet 10 is comprised of a coil 10a, a bobbin 10b and a yoke 10c. Upon the flow of an electric current through the coil 10a, the bent portion 31b of the shutter-closing member 31 is magnetically attracted to the yoke 10c. This attracting force is greater than the force of the spring 32. An iron core 36 is provided with a bent portion 36a which engages in the slot 33b of the shutter-opening member 33 and is arranged so as to be movable longitudinally through the cylindrical hollow portion formed in the central region of the bobbin 10b. Upon the flow of a current through the coil 10a, this iron core 36 is attracted in the direction of the arrow. The power switch 12 is comprised of two resilient strips 12a and 12b and a fixing member 12c which is fixed to the baseplate 17. These two resilient strips 12a and 12b are both imparted the tendency to contact the fixing member 12c.

Description will hereunder be made on the function of the embodiment shown in FIGS. 1 and 3. FIGS. 1 and 3 show the state of the shutter when cocked. As will be understood from FIG. 1, the switch 16 is open, and accordingly, in this case, it is to be understood that there is going to be performed a photography in which the self-timer is not used.

In the state of the system shown in FIG. 3, the release lever 18 is rotated clockwise against the force of the spring 20. Whereupon, the bent portion 18a of the release lever 18 is relieved of its engagement with the stepped portion 21a of the auxiliary driving member 21. As a result, the principal driving member 24 is rotated counterclockwise while pushing, with its side face 24c, the bent portion 21b of the auxiliary driving member 21 by virtue of the force exerted by the powerful spring 25. This counterclockwise rotation of the principal driving member 24 is arrested when its side face 24c hits the bent portion 31a of the shutter-closing member 31. Since the position of the pin 24a of the principal driving member 24 is shifted as the latter makes a counterclockwise rotation, the resilient strip 12a of the power switch 12 effects the shifting of its position by virtue of its given nature, resulting in its contacting the fixing member 12c. As a consequence, the power switch 12 is closed.

When the power switch 12 is thus closed in the state of the circuit shown in FIG. 1, the transistor 6 is retained in its "cutoff" state since the potential of the base electrode of this transistor 6 is lower than the potential of the emitter electrode thereof. Accordingly, the transistor 8 is held in its "cutoff" state, whereas the transistor 9 is rendered to its "on" state, so that a current is allowed to flow through the electromagnet 10.

In FIG. 3, when a current flows through the coil 10a of the electromagnet 10, the latter 10 magnetically attracts the bent portion 31b of the shutter-closing member 31 to said electromagnet and, on the other hand, the electromagnet 10 causes the iron core 36 to move in the direction of the arrow.

As the iron core 36 moves in the direction of the arrow, the shutter-opening member 33 is rotated clockwise against the force of the spring 35. As a result of this clockwise rotation of the shutter-opening member 33, the bent portion 33a of this member 33 is relieved of its engagement with the stepped portion 26d of the shutter-actuating member 26. As a consequence, the shutter-actuating member 26 is rotated clockwise by the force of the spring 27. It is to be understood that the pin 26a of the shutter-actuating member 26 is passed through the slot 17b of the baseplate 17 to protrude beyond the rear side of this baseplate 17, and that, there, the pin 26a is coupled to the shutter blades (not shown) of any known type. These shutter blades continue to cover the aperture 17a whenever the shutter-actuating member 26 is held in its position shown in FIg. 3. Accordingly, as the shutter-actuating member 26 is rotated clockwise by the force of the spring 27 in the manner as stated above, the shutter blades are caused to be opened. Along with this clockwise rotation of the shutter-actuating member 26, its pin 26c pushes the side face 28a of the holding member 28 to cause this latter member 28 to rotate clockwise against the force of the spring 30. However, because of the fact that the bent portion 31b of the shutter-closing member 31 has been already attracted to the electromagnet 10, said shutter-closing member 31 is not allowed to rotate clockwise even by the pulling force of the spring 32. As a result, the principal driving member 24 is continuously rendered to the state in which it is unable to make a counterclockwise rotation, as it has been, because of its engagement with the bent portion 31a.

On the one hand, immediately after the engagement between the stepped portion 26d of the shutter-actuating member 26 and the bent portion 33a of the shutter-opening member 33 is relieved, the switch 3 is caused to open as the pin 33c of the shutter-opening member 33 is moved. With the opening of this switch 3 in FIG. 1, the capacitor 2 is charged via the photoconductive element 1. As a result, the potential of the base electrode of the transistor 6 is elevated. When the potential of said base electrode becomes higher than the potential of the emitter electrode, the transistor 6 is rendered to the "on" state. As a result, the transistor 9 is rendered to the "cutoff" state, so that there is supplied no current to the electromagnet 10. The length of time from the time at which the switch 3 is opened till the time at which the transistor 6 is switched from its "cutoff" state to its "on" state, can vary depending on the intensity of illumination of the scene incident to the photoconductive element 1.

In FIG. 3, upon the cessation of the current flow to the coil 10a of the electromagnet 10, the shutter-opening member 33 is rotated counterclockwise by the force of the spring 35, whereas the shutter-closing member 31 is rotated clockwise by the force of the spring 32. This clockwise rotation of the shutter-closing member 31 causes the bent portion 31a of this member 31 to be relieved from its engagement with the side face 24c of the principal driving member 24. As a consequence, the principal driving member 24 is rotated counterclockwise still further by the force of the spring 25. As this principal driving member 24 is rotated counterclockwise in this way, it works so as to relieve the resilient strip 12b from the latter's engagement with the fixing member 12c owing to this strip's being engaged by the moving pin 24a to thereby open the switch 12, and also works so that its side face 24b pushes the pin 26b of the shutter-actuating member 26 to cause the latter member 26 to rotate counterclockwise against the force of the spring 27. As a result of this counterclockwise rotation of the shutter-actuating member 26, the latter member 26 as well as the holding member 28, the shutter-closing member 31 and the shutter-opening member 33 are all caused to return to their initial positions shown in FIG. 3, and thus, the shutter blades are closed.

The cocking of the shutter is effected by rotating, in any appropriate manner, the principal driving member 24 clockwise against the force of the spring 25. Along with this, the auxiliary driving member 21 also is caused to rotate clockwise by the force of the spring 23. Both the principal driving member 24 and the auxiliary driving member 21 are rotated clockwise continuously until the stepped portion 21a of the auxiliary driving member 21 is brought into engagement with the bent portion 18a of the release lever 18, so that this release lever 18 is returned to its cocked position shown in FIG. 3.

When it is intended to perform a photography by utilizing the self-timer, it is necessary to close the switch 16 prior to the performance. By rotating, in this state of the switch 16, the release lever 18 clockwise in FIG. 3, both the principal driving member 24 and the auxiliary driving member 21 are rotated counterclockwise continuously until their movements are arrested by the engagement with the bent portion 31a of the shutter-closing member 31 in the manner as stated previously, and thus, the power switch 12 is closed.

When this power switch 12 is closed, the potential of the base electrode of the transistor 15 becomes higher than the potential of the emitter electrode thereof. As a result, the transistor 15 is rendered to the "on" state. Accordingly, the transistor 8 is rendered to the "on" state, whereas the transistor 9 is rendered to the "cutoff" state, so that there flows no current to the electromagnet 10. As time passes, the potential of the base electrode of the transistor 15 gradually drops and it eventually becomes lower than the initial potential it had. When this potential of the base electrode of the transistor 15 has become lower than the potential of the emitter electrode thereof, this transistor 15 is rendered to the "cutoff" state. As a result, the transistor 8 is rendered to the "cutoff" state, whereas the transistor 9 is rendered to the "on" state, so that a current is allowed to flow through the electromagnet 10. As a consequence, the shutter-opening member 33 is rotated clockwise in the same manner as that described in connection with the photography in which the self-timer is not used, and thus, the shutter blades are opened.

Since the actions performed by the mechanism shown in FIG. 3 after the current has started to flow through the electromagnet 10 are exactly the same as those described above in connection with the photography in which the self-timer is not used, the description of these actions is omitted. The length of time from the time at which the power switch 12 is closed till the time at which the current starts to flow through the electromagnet 10 is determined by the delay circuit assigned for controlling the self-timing which is comprised of the resistor 13 and the capacitor 14. Accordingly, by forming this resistor 13 with a variable resistor, said length of time can be selected freely prior to performing a photography.

As will be understood also from the foregoing statement, the present invention can be applied not only to the lens shutter but also the focal plane shutter. In other words, the present invention can be applied to shutters of any type, provided that the shutter is equipped with a single electromagnet which is operative so that, when a current is supplied to this electromagnet, it causes the shutter to start its opening movement and that, when the current ceases to flow through the electromagnet, it causes the shutter to start its closing movement. In FIg. 3, the principal driving member 24 and the auxiliary driving member 21 are provided separately from each other. It should be noted, however, that these two members may be formed as an integral body.

Figure 2:
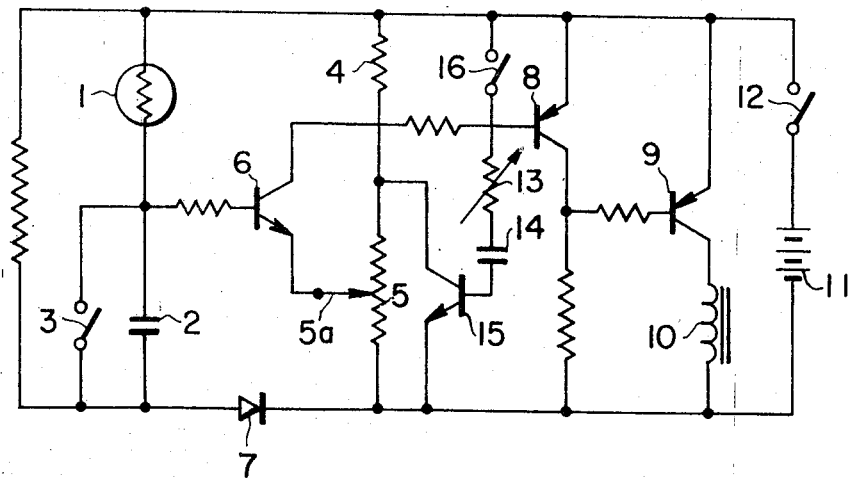
FIG. 2 is a circuit diagram representing a modification of the control circuit shown in FIG. 1.

FIG. 2 shows a modified form of the circuit shown in FIG. 1. The circuit shown in FIG. 2 is exactly the same in arrangement as that shown in FIG. 1 excepting the fact that the collector electrode of the transistor 15 is connected to the connecting point between the resistor 4 and the potentiometer 5. Accordingly, the respective constituent elements of the circuit in FIG. 2 are indicated by like reference numerals used in FIG. 1.

Description will hereunder be made on the actions of the constituent elements of the circuit shown in FIG. 2 wherein the photography is performed by the use of the self-timer. When the power switch 12 is closed, the transistor 15 is rendered to the "on" state since the switch 16 has been closed preliminarily. The diode 7 has been already sufficiently biasing the base electrode of the transistor 6. Therefore, when the transistor 15 is rendered to the "on" state, the transistor 6 is rendered to the "on" state also. As a consequence, the transistor 8 is rendered to the "on" state, whereas the transistor 9 is rendered to the "cutoff" state, so that there flows no current to the electromagnet 10. On the other hand, the capacitor 14 is charged via the transistor 13, and accordingly, the potential of the base electrode of the transistor 15 drops. After the lapse of a predetermined length of time, the potential of the base electrode of the transistor 15 becomes lower than the potential of the emitter electrode thereof, and as a consequence, said transistor 15 is rendered to the "cutoff" state. Accordingly, the potential of the emitter electrode of the transistor 6 becomes higher than the potential of the base electrode thereof, resulting in that the said transistor 6 is rendered to the "cutoff" state. Along with this, the transistor 8 is rendered to the "cutoff" state, whereas the transistor 9 is rendered to the "on" state, so that the current is allowed to flow to the electromagnet 10. The manner of the subsequent actions of the system to control the exposure time is identical with that described in connection with the photography in which the circuit shown in FIG. 1 is used, and therefore, their description is omitted.

In the embodiment shown in FIG. 1, the delay circuit for controlling the self-timing is arranged to be operative in such a way that the transistor 8 is rendered to the "on" state for a predetermined length of time to prevent the current from flowing to the electromagnet. In contrast to this, the embodiment shown in FIG. 2 is arranged to be operative so that the transistor 6 is rendered to the "on" state to prevent the current from flowing to the electromagnet. Accordingly, this delay circuit for controlling the self-timing may be connected directly, without the fear for the occurrence of any harm, to the transistor 9 in such a fashion that said transistor 9 is rendered to the "cutoff" state. In such an instance, it is inly necessary to connect the collector electrode of the transistor 15 directly to the power source battery and to connect the emitter electrode of this transistor 15 to the base electrode of the transistor 9.

What is claimed is:

1. An electronic shutter circuitry for photographic cameras, comprising:
   a first delay circuit connected to a power source for controlling exposure time including a first resistor and a first capacitor connected to said first resistor,
   a first switch connected in parallel with said first capacitor which opens when the shutter begins to open for causing said first capacitor to begin to charge through said first resistor and initiating the timing action of said first delay circuit when said first switch opens,
   a first electronic switching means connected to said first resistor and said first capacitor for shifting from a first to second output condition when the charge on said first capacitor exceeds a predetermined value,
   an amplifier, including at least one transistor, connected to said first electronic switching means and having an output terminal,
   a single electromagnet connected to the output terminal of said amplifier for controlling the starting of the opening movement of the shutter whenever energized and controlling the starting of the closing movement of the shutter whenever deenergized by said first electronic switching means as it shifts from its first to second condition,
   a second delay circuit for controlling the self-timing including a second resistor and a second capacitor,
   a second electronic switching means connected to said second delay circuit for keeping the current from flowing to said electromagnet until this second switching means has been controlled for a predetermined length of time by said second delay circuit, and a second switch connected to the power source and operable to connect said second delay circuit to the power source.

2. An electronic shutter according to claim 1, in which said first resistor is a photosensitive element.

3. An electronic shutter according to claim 2, in which said photosensitive element is a photoconductive element.

4. An electronic shutter according to claim 1 in which said second electronic switching means is connected to said transistor of said amplifier.

5. An electronic shutter according to claim 1, in which both of said first electronic switching means and said second electronic switching means are transistors.

6. An electronic shutter according to claim 5, in which a potentiometer is connected to the emitter electrode of said first switching transistor, and is regulated by establishing one of the exposure factors.

7. An electronic shutter according to claim 5 in which the collector electrode of said second switching transistor is connected to the emitter electrode of said first switching transistor.

8. An electronic shutter according to claim 6, in which the collector electrode of said second switching transistor is connected, via said potentiometer, to the emitter electrode of said first switching transistor.

9. An electronic shutter according to claim 1, in which said first resistor is a variable resistor.

10. An electronic shutter according to claim 1, in which said second resistor is a variable resistor.

* * * * *